(12) United States Patent
Gotoh et al.

(10) Patent No.: US 6,638,596 B1
(45) Date of Patent: Oct. 28, 2003

(54) THIN FILM MAGNETIC HEAD USING SOFT MAGNETIC FILM HAVING SOFT MAGNETIC CHARACTERISTICS OF HIGH RESISTIVITY, LOW COERCIVE FORCE, AND HIGH SATURATION MAGNETIC FLUX DENSITY

(75) Inventors: Mitsuhiro Gotoh, Niigata-ken (JP); Hisayuki Yazawa, Niigata-ken (JP); Yoshihiro Kanada, Niigata-ken (JP); Mitsuo Kawasaki, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/599,498

(22) Filed: Jun. 22, 2000

(30) Foreign Application Priority Data

Jun. 22, 1999 (JP) .............................. 11-174844
Jan. 14, 2000 (JP) ...................... 2000-005569

(51) Int. Cl.$^7$ ................................. G11B 5/31
(52) U.S. Cl. ....................... 428/141; 428/680; 428/681; 428/692; 428/702; 428/704; 360/110
(58) Field of Search .................. 360/110; 428/611, 428/680, 681, 684, 141, 698, 702, 704, 900, 694 T, 692

(56) References Cited

U.S. PATENT DOCUMENTS

| | | | |
|---|---|---|---|
| 5,264,981 A | | 11/1993 | Campbell et al. |
| 5,302,469 A | * | 4/1994 | Sugenoya et al. ........ 428/694 T |
| 5,416,656 A | * | 5/1995 | Fukuda et al. ............... 360/103 |
| 5,589,221 A | * | 12/1996 | Hiramoto et al. ............ 427/130 |
| 5,750,251 A | | 5/1998 | Ohji |
| 6,063,512 A | * | 5/2000 | Osaka et al. .............. 428/694 T |
| 6,124,047 A | * | 9/2000 | Hasegawa .................... 428/692 |
| 6,132,892 A | * | 10/2000 | Yoshikawa et al. ......... 428/692 |
| 6,150,046 A | * | 11/2000 | Watanabe et al. ........ 428/694 R |
| 6,210,543 B1 | * | 4/2001 | Kobayashi ................ 204/192.2 |
| 6,346,338 B1 | * | 2/2002 | Watanabe et al. ........... 428/692 |

FOREIGN PATENT DOCUMENTS

| | | | |
|---|---|---|---|
| JP | 53-84830 | | 7/1978 |
| JP | 01-287250 A | * | 11/1989 |
| JP | 9-63016 | | 3/1997 |
| JP | 9-171925 | | 6/1997 |
| JP | 10-222813 A | * | 8/1998 |
| JP | 11-025420 A | * | 1/1999 |
| JP | 11-054325 | * | 2/1999 |
| JP | 11-086234 A | * | 3/1999 |
| JP | P2000-150233 A | * | 5/2000 |

OTHER PUBLICATIONS

Dewent Abstract Translation of JP P2000–150233–A (Derwent Acc. No. 2000–434586).*
JPO Abstract Translation of JP 10–222813–A (Clipped Image No. JP410222813A).*
JPO Abstract Translation of JP JP 11–025420–A (Clipped Image No. JP411025420A).*
JPO Abstract Translation of JP JP 11–086234–A (Clipped Image No. JP41086234A).*
English Translation of Yoshizawa et al. (JP 01–287250–A).*
Machine Translation of JP 11–025420–A.*
Machine Translation of JP 11–086234–A.*
Excel spreadsheet titled "Range in mass of the Osaka et al. samples".*
Derwent Abstract Translation of Tokkyo Kokai 11–054325 (Derwent Image No JP411054325A).*

* cited by examiner

*Primary Examiner*—Paul Thibodeau
*Assistant Examiner*—Kevin Bernatz
(74) *Attorney, Agent, or Firm*—Brinks Hofer Gilson & Lione

(57) ABSTRACT

A soft magnetic film of the invention is to improve a resistivity ρ while maintaining a coercive force Hc and a saturation magnetic flux density Ms in good states by adding an element X (X is one or more kinds of elements selected from O, C, N, and S). Further, a thin film magnetic head capable of coping with an increase in a recording density and an increase in a recording frequency can be provided by using the soft magnetic film in core layers.

7 Claims, 10 Drawing Sheets

COMPOSITION VALUE OF C [MASS %]

COMPOSITION VALUE OF S [MASS %]

THIN FILM MAGNETIC HEAD USING SOFT MAGNETIC FILM HAVING SOFT MAGNETIC CHARACTERISTICS OF HIGH RESISTIVITY, LOW COERCIVE FORCE, AND HIGH SATURATION MAGNETIC FLUX DENSITY

BACKGROUND OF THE INVENTION

1. Field of the Invention

The present invention relates to a soft magnetic film used as, for example, a core layer of a thin film magnetic head. More particularly, the present invention relates to a soft magnetic film having soft magnetic characteristics of, in particular, a high resistivity $\rho$, a low coercive force Hc and a high saturation magnetic flux density Ms, to a method of manufacturing the soft magnetic film, and to a thin film magnetic head using the soft magnetic film.

2. Description of the Related Art

A magnetic head mounted on, for example, a hard disc and the like has a thin film magnetic head disposed at the extreme end of a gimbal, and the thin film magnetic film is composed of a writing inductive head and a reading MR head.

The inductive head is ordinarily composed of a lower core layer formed of a magnetic material, an upper core layer facing the lower core layer through a non-magnetic gap layer, and a coil layer for inducing a recording magnetic field to both the layers.

The upper core layer and the lower core layer have been formed of an existing magnetic material such as a Ni—Fe alloy film (Permalloy) and the like. The Permalloy has a high permeability and a relatively high saturation magnetic flux density Ms.

However, when the recording frequency and recording density increase the Permalloy which forms the lower core layer and the upper core layer generates an eddy current because it has a low resistivity $\rho$. A thermal loss is liable to be caused by the eddy current.

SUMMARY OF THE INVENTION

An object of the present invention for solving the above problem is to provide a soft magnetic film which improves the resistivity $\rho$ while maintaining the coercive force Hc and a saturation magnetic flux density Ms in a suitable state by adding an element X (X to the Ni—Fe alloy is one or more the group of elements selected from O (oxygen), C (carbon), N (nitrogen), and S (sulfur)) further objects of the present invention are, to provide a method of manufacturing the soft magnetic film, and to provide a thin film magnetic head capable of coping with an increase in the recording density and an increase in the recording frequency by using the soft magnetic film in core layers.

A soft magnetic film of the present invention contains at least Ni, Fe and an element X (X is one or more kinds of elements selected from O, C, N, and S) as the competition thereof, the average grain size of the soft magnetic film is 80 Å or less, and an amount of Fe is 30 percent by mass or more.

It is preferable that the average grain size be within the range of 60 Å or more to 80 Å or less.

It is preferable in the present invention that O, C, and S be contained as the composition of the soft magnetic film.

In the above case, it is preferable that the composition ratio of O+C+S, which is obtained by adding the composition ratios of O, C, and S, be 0.60 percent by mass or more to 5.00 percent by mass or less.

In the range of the above numerical values, it is preferable that the composition ratio of O is 0.40 percent by mass or more to 3.70 percent by mass or less.

It is preferable that the composition ratio of C is 0.11 percent by mass or more to 0.90 percent by mass or less.

Further, it is preferable that the composition ratio of S is 0.05 percent by mass or more to 0.43 percent by mass or less.

In the present invention, the resistivity $\rho$ of the soft magnetic film can be made to 60 $\mu\Omega\cdot$cm or more to 210 $\mu\Omega\cdot$cm or less by restricting the numerical values as described above.

It is more preferable that the composition ratio of O+C+S which is obtained by adding the composition ratios of O, C, and S be 1.16 percent by mass or more to 5.00 percent by mass or less.

Within the range of above numerical values, it is preferable that the composition ratio of O be 0.87 percent by mass or more to 3.70 percent by mass or less.

It is preferable that the composition ratio of C be 0.21 percent by mass or more to 0.90 percent by mass or less.

Further, it is preferable that the composition ratio of S be 0.10 percent by mass or more to 0.43 percent by mass or less.

In the present invention, the resistivity $\rho$ of the soft magnetic film can be made to 80 $\mu\Omega\cdot$cm or more to 210 $\mu\Omega\cdot$cm or less by restricting the numerical values as described above.

In the present invention, it is more preferable that the composition ratio of O+C+S which is obtained by adding the composition ratios of O, C, and S be 1.73 percent by mass or more to 5.00 percent by mass or less.

In the range of above numerical values, it is preferable that the composition ratio of O be 1.30 percent by mass or more to 3.70 percent by mass or less.

It is preferable that the composition ratio of C be 0.32 percent by mass or more to 0.90 percent by mass or less.

Further, it is preferable that the composition ratio of S is 0.15 percent by mass or more to 0.43 percent by mass or less.

In the present invention, the resistivity $\rho$ of the soft magnetic film can be made to 100 $\mu\Omega\cdot$cm or more to 210 $\mu\Omega\cdot$cm or less by restricting the numerical values as described above.

It is preferable in the present invention that the average roughness (Ra) of the centerline of the film surface of the soft magnetic film be 140 Å or less. With this arrangement, the coercive force Hc of the soft magnetic film can be made to 118.5 A/m or less.

In the present invention, it is more preferable that the average roughness (Ra) of the centerline of the film surface of the soft magnetic film be 120 Å or less. With this arrangement, the coercive force Hc of the soft magnetic film can be made to 79 A/m or less.

In the present invention, it is furthermore preferable that the average roughness (Ra) of the centerline of the film surface of the soft magnetic film be 50 Å or less. With this arrangement, the coercive force Hc of the soft magnetic film can be made to 39.5 A/m or less.

In the present invention, the saturation magnetic flux density Ms of the soft magnetic film can be made to 1.0 T or more.

It is preferable that the soft magnetic film be formed by plating.

In the present invention, it is preferable that the soft magnetic film be formed in a plating bath containing Fe ions and Ni ions to which amino organic materials are added and that the soft magnetic film contain at least Fe, Ni and the element X, which is at least one element element selected from the group of O, C, N, and S.

Further, it is preferable in the present invention that saccharin be added to the plating bath. The addition of the saccharin increases particularly the multiplier effect of the saccharin and the amino organic materials, whereby the resistivity ρ can be increased because the non-metal element X such as O, C, N, S and the like is contained in the soft magnetic film. Further, it is also possible to reduce the stress of the soft magnetic film formed by the plating through the addition of the saccharin.

In the present invention, it is contemplated that $SO_2$ contained in the saccharin enters the composition of the soft magnetic film by the addition thereof in the plating bath as described above so that S can be contained in the soft magnetic film.

In the present invention, it is preferable that the pH (index for the hydrogen ion concentration) of the plating bath be kept to 1.8 or less. The pH of the plating bath is more preferably kept to 1.7 or less and furthermore preferably to 1.5 or less.

Further, in the present invention, it is preferable that the temperature of the plating bath be kept within the range of from 20° C. to 28° C.

In the present invention, it is preferable that the amino organic material is at least one or material selected from the group of ethylenediamine (EDA), diethylenetriamine (DETA), triethylenetetramine (TETA), alanine (Ala) and glutamic acid (Glu).

In the present invention, when the element X wherein at least one X is elements selected from the group of O, C, N, and S is contained in the soft magnetic film composed of a Ni—Fe alloy, the resistivity ρ is improved while maintaining the coercive force Hc and the saturation magnetic flux density Ms to be substantially similar levels as those of the Ni—Fe alloy.

Ni and Fe contained in the soft magnetic film of the present invention carry magnetism. In particular, it is preferable that the content of Fe be as large as possible to obtain a high saturation magnetic flux density Ms.

Since the element X (X is one or more element selected from O, C, N, and S) is a non-metal material, the resistivity ρ of the soft magnetic film can be improved by containing the element X in the soft magnetic film. The crystal of the soft magnetic film can be miniaturized by the element X contained therein. It has been confirmed by the experiment which will be described later that when the average grain size of the soft magnetic film is made to 80 Å or less by containing the element X in a proper amount, the resistivity ρ is improved as compared with that of the Ni—Fe alloy which has been used as core layers.

In the present invention, when Fe is contained in the soft magnetic film in an amount of 30 percent by mass or more, the resistivity ρ of the soft magnetic film is improved the coercive force Hc is low as that of the Ni—Fe alloy and the saturation magnetic flux density Ms is as high as that of the Ni—Fe alloy.

In the present invention, it is preferable that S be contained in the soft magnetic film and that the three elements of O, C, and S are contained in the soft magnetic film.

In the present invention, the relationship between contents (percent by mass) of O, S, and C and a resistivity ρ is determined, thereby obtaining the proper amounts of them as explained in the experiment to be described later.

In the present invention, it has been found that a coercive force Hc cannot be always suppressed to a low level only by adjusting the contents of Fe, and the like as described above. The respective conditions of the plating bath used in the formation of the soft magnetic film must be properly adjusted to properly reduced the coercive force Hc.

In the present invention, when the amino organic materials are added to contain Fe ions and Ni ions in the plating bath and further to contain the element X (X is one or more kinds of elements selected from O, C, N, and S) in the soft magnetic film, the pH of the plating bath is reduced and specifically set to 1.8 or less. When the pH is kept as low as 1.8 or less and further the temperature of the plating bath is kept as low as 20° C. to 28° C., a film forming rate is delayed and the average roughness (Ra) of the centerline a formed soft magnetic film is made to 140 Å or less.

As described above, according to the present invention, it is contemplated that crystallomagnetic anisotropic energy, which influences the coercive force Hc can be weakened by setting the pH of the plating bath to 1.8 or less and by setting the average roughness (Ra) of the centerline of the formed soft magnetic film to 140 Å or less, whereby the coercive force Hc can be reliably reduced.

The magnetic head according to the present invention includes a lower core layer, an upper core layer acting as a surface facing a recording medium which faces the lower core layer through a magnetic gap, and a coil layer for inducing a recording magnetic field to both the core layers. Further, at least one of the upper core layer and the lower core layer are formed of the soft magnetic film.

As described above, in the present invention, the soft magnetic film which has a high resistivity ρ and further maintains a low coercive force Hc and a high saturation magnetic flux density Ms is used as at least one of the lower core layer and the upper core layer. With this arrangement, the magnetic head which can cope with an increase in the in both instance recording density and an increase in a recording frequency may be manufactured.

DESCRIPTION OF THE PREFERRED EMBODIMENT

Figure 1:
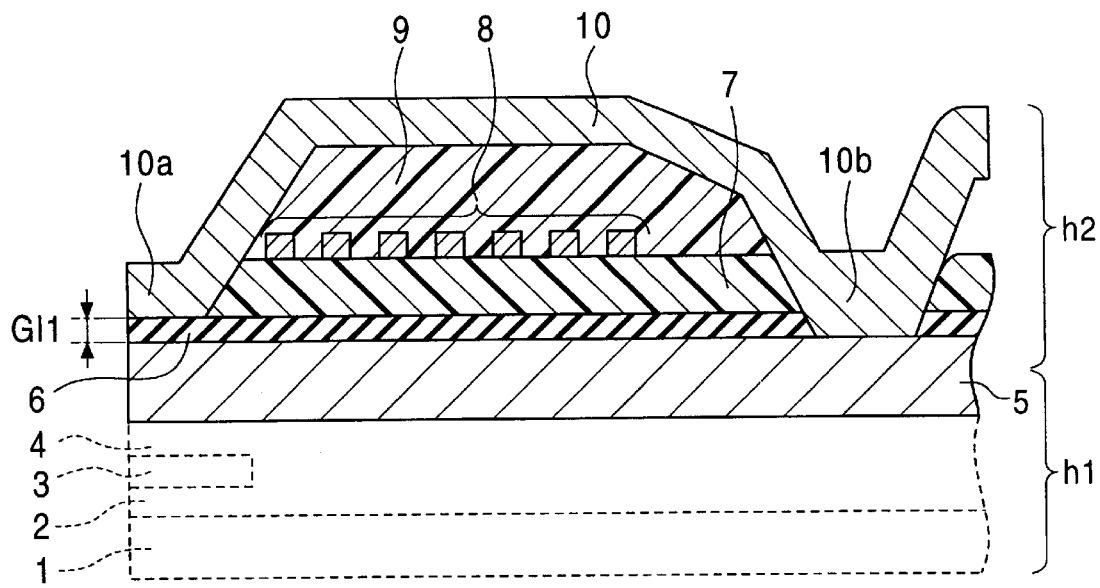
FIG. 1 is a longitudinal sectional view of a thin film magnetic head of an embodiment of the present invention.

FIG. 1 is a longitudinal sectional view of a thin film magnetic head of an embodiment of the present invention. Note that the left end surface of the thin film magnetic head shown in FIG. 1 serves as a surface facing a recording medium.

The thin film magnetic head of the embodiment of the present invention is formed on the trailing side end surface of a slider constituting a floating type head and arranged as an MR/inductive composite type thin film magnetic head (hereinafter, simply referred to as a thin film magnetic head) in which an MR head h1 and a writing inductive head h2 are laminated.

The MR head h1 reads a recorded signal by detecting a leakage magnetic field leaked from a recording medium such as a hard disc and the like making use of a magnetoresistive effect. A lower shield layer 1, which is composed of a soft magnetic material, is formed on the trailing side end surface of the slider.

As shown in FIG. 1, a magnetoresistive effect element layer 3 is formed on the lower shield layer 1 through a lower gap layer 2 which is formed of a non/magnetic material such as $Al_2O_3$ (alumina) and the like. Note that the magnetoresistive effect element layer 3 is arranged as an AMR structure or a GMR structure which is represented by a spin-valve film making use of a large magnetoresistive effect.

A lower core layer 5, which has both the shield effect of the MR head hi and the core function of the inductive head h2, is formed on the magnetoresistive effect element layer 3 through an upper gap layer 4 composed of a non-magnetic material.

Further, as shown in FIG. 1, a magnetic gap layer (non-magnetic material layer) 6, which is composed of alumina and the like, is formed on the lower core layer 5. Furthermore, a coil layer 8, which is patterned to have a spiral plane shape, is formed on the magnetic gap layer 6 through an insulating layer 7 composed of polyimide or a resist material. The coil layer 8 is formed of a non-magnetic conductive material having a small electric resistance such as Cu (copper) and the like.

Further, the coil layer 8 is surrounded by an insulating layer 9 formed of polyimide or a resist material, and an upper core layer 10, which is composed of a soft magnetic material, is formed on the insulating layer 9.

As shown in FIG. 1, the extreme end 10a of the upper core layer 10 faces the upper surface of the lower core layer 5 on the surface thereof facing the recording medium through the magnetic gap layer 6, and a magnetic gap having a magnetic gap length GL1. is formed therebetween. As shown in FIG. 1, the base end 10b of the upper core layer 10 is magnetically connected to the lower core layer 5.

To cope with an increase in recording density and an increase in recording frequency and to improve the writing capability of the inductive head h2, it is necessary to improve resistivity $\rho$ while maintaining the soft magnetic characteristics of the upper core layer 10. The soft magnetic characteristics include a high saturation magnetic flux density Ms and a low coercive force Hc. The resistivity $\rho$ must be improved to reduce an eddy current loss due to the increase in the recording frequency.

Further, it is preferable that the lower core layer 5 also be formed of a soft magnetic film having soft magnetic characteristics such as a high resistivity $\rho$ the a low coercive force Hc. It is preferable that the lower core layer 5 have a high saturation magnetic flux density Ms. However, it known that when a leakage magnetic field between the lower core layer 5 and the upper core layer 10 can be easily magnetized and reversed by making the saturation magnetic flux density Ms of the lower core layer 5 lower than that of the upper core layer 10, a density at which a signal is written to a recording medium can be more increased.

In the present invention, the lower core layer 5 and/or the upper core layer 10 is formed of a soft magnetic film which contains at least Ni (nickel), Fe (iron), and an element X wherein X is at least one elements selected from C the group of (carbon) O (oxygen), N (nitrogen), and S (sulfur) as the composition elements.

Moreover, the soft magnetic film in the present invention is formed to have an average grain size of 80Å (angstroms) or less.

When the non-metallic element X is contained in the soft magnetic film composed of Ni and Fe, miniaturization of the average grain size of the soft magnetic film is accelerated, and it is possible to set the average grain size to 80 Å or less by properly adjusting the content and the like of the element X. The resistivity ρ can be improved and the coercive force Hc can be reduced by accelerating the miniaturization of the average grain size. It is preferable to set the average grain size within the range of from 60 Å to 80 Å.

Further, in the present invention, the amount of Fe contained in the soft magnetic film is properly adjusted, in addition to that the average grain size is properly set.

In the present invention, it is preferable to set the content of Fe to 30 percent by mass or more. The resistivity ρ can be more increased than that of a Ni—Fe alloy film by the above amount of Fe and the average grain size set to 80 Å or less. Specifically, the resistivity ρ can be set to 60 μΩ·cm or more, and moreover the coercive force Hc and the saturation magnetic flux density Ms can be kept as high as those of the Ni—Fe alloy film.

Further, in the present invention, it is preferable that S (sulfur) be contained in the soft magnetic film. With this arrangement, the resistivity ρ can be properly improved.

In the present invention, it is particularly preferable that O and C and further S of the element X be contained in the soft magnetic film.

Incidentally, the content of Fe in the soft magnetic film and the average grain size thereof are exemplified as factors for changing the resistivity of the soft magnetic film as described above. However, it has been found that a predetermined resistivity cannot be obtained only by the above factors unless the contents of non-metallic elements in the soft magnetic film are properly adjusted.

While it is preferable in the present invention that the resistivity of the soft magnetic film be set to at least 60 μΩ·cm, any value of 60 μΩ·cm or more is not always acceptable. A great increase in the resistivity results in a problem of a decrease in the saturation magnetic flux density Ms and an increase in the coercive force Hc conversely. Thus, in the present invention, while it is preferable that the resistivity ρ be high, the saturation magnetic flux density Ms is kept to a value which is as high as that of a conventional saturation magnetic flux density at the same time.

Specifically, it is preferable that the composition ratio of O+C+S which is obtained by adding the composition ratios of O, C and S be 0.60 percent by mass or more to 5.00 percent by mass or less.

In this case, it is preferable that the composition ratio of O be 0.40 percent by mass or more to 3.70 percent by mass or less within the above numerical value range.

Further, it is preferable that the composition ratio of C be 0.11 percent by mass or more to 0.90 percent by mass or less within the above numerical value range.

Furthermore, it is preferable that the composition ratio of S be 0.05 percent by mass or more to 0.43 percent by mass or less within the above numerical value range.

As described above, the resistivity ρ of the soft magnetic film can be set to 60 μΩ·cm or more to 210 μΩ·cm or less by properly setting the composition ratios of O, C and S. When the resistivity of the soft magnetic film is set to 210 μΩ·cm or less, a saturation magnetic flux density Ms of about 1.0 T (tesla) is obtained.

Further, in the present invention, it is more preferable that the composition ratio of O+C+S, which is obtained by adding the composition ratios of O, C and S be 1.16 percent by mass or more to 5.00 percent by mass or less.

In this case, it is preferable that the composition ratio of O be 0.87 percent by mass or more to 3.70 percent by mass or less within the above numerical value range.

Further, it is preferable that the composition ratio of C be 0.21 percent by mass or more to 0.90 percent by mass or less within the above numerical value range.

Furthermore, it is preferable that the composition ratio of S be 0.10 percent by mass or more to 0.43 percent by mass or less within the above numerical value range.

As described above, the resistivity ρ of the soft magnetic film can be set to 80 μΩ·cm or more to 210 μΩ·cm or less by properly setting the composition ratios of O, C and S.

Further, in the present invention, it is more preferable that the composition ratio of O+C+S which is obtained by adding the composition ratios of O, C and S be 1.73 percent by mass or more to 5.00 percent by mass or less.

In this case, it is preferable that the composition ratio of O be 1.30 percent by mass or more to 3.70 percent by mass or less within the above numerical value range.

Further, it is preferable that the composition ratio of S be 0.15 percent by mass or more to 0.43 percent by mass or less within the above numerical value range.

As described above, the resistivity ρ of the soft magnetic film can be set to 100 μΩ·cm or more to 210 μΩ·cm or less by properly setting the composition ratios of O, C and S.

It has been confirmed that the coercive force Hc will greatly depend on the amount of Fe from the result of the experiment to be described later. Further, it is conceived that the coercive force Hc will be influenced by the additive amounts of other elements contained in the soft magnetic film.

In the present invention, however, it has been found that the coercive force Hc in particular can be reliably reduced depending upon the conditions of a plating bath. In the present invention, the average roughness (Ra) of the centerline of the film surface of a soft magnetic film having been formed is reduced by properly adjusting the pH of a plating bath and the temperature thereof as described below, whereby the coercive force Hc can be more reliably reduced.

In the present invention, it is preferable that the average roughness (Ra) of the centerline of the film surface of the soft magnetic film be 140 Å or less. The average roughness (Ra) is more preferably 120 Å or less and furthermore preferably 50 Å or less.

As described above, in the present invention, the average grain size of the soft magnetic film, the amount of Fe contained in the soft magnetic film, the amount of the element X contained in the soft magnetic film, and the average roughness (Ra) of the centerline of the film surface are properly adjusted within the ranges of the above numerical values. As a result, it is possible to form a soft magnetic film in which the resistivity ρ is set to 60 μΩ·cm or more, more preferably to 80 μΩ·cm or more and furthermore preferably to 100 μΩ·cm or more, in which the coercive force Hc is set to 118.5 A/m (oersted) or less, more preferably to 79 A/m or less and furthermore preferably to 39.5 A/m and in which the saturation magnetic flux density Ms is set to 1.0 T (tesla) or more.

The use of the soft magnetic film having the high resistivity ρ for the lower core layer 5 and/or the upper core layer 10 of a thin film magnetic head can reduce an eddy current loss regardless that the recording frequency is increased. Moreover, since the soft magnetic film of the present invention maintains the soft magnetic characteristics of the low coercive force Hc and the high saturation magnetic flux density Ms, it is possible to manufacture a thin film magnetic head, which can cope with the increase in the recording density and the increase in the recording frequency in the future.

The film surface of the soft magnetic film of the present invention has a small average roughness (Ra) of the centerline. The film surface is less roughed. The upper core layer 10 and at least one of the lower core layer 5, which is formed of the soft magnetic film, can be properly formed in a predetermined shape in the vicinity of the surface, on the left side shown in FIG. 1). The surface is prescribed as a track width and faces a recording medium. Hence recording characteristics can be maintained in a good state.

Incidentally, in the present invention, the soft magnetic film, which is formed by being added with Fe and Ni and further with the element X (X is at least one element selected from the group of C, O, N, and S) as the composition, is formed in a plating bath which contains Fe ions and Ni ions to which amino organic materials are added.

In the present invention, it is preferable that at least one organic material containing an amino group (—$NH_2$) be selected as the amino organic material to be added. Specifically, it is preferable that at least one of the group ethylenediamine (EDA; $NH_2$—$(CH_2)_2$—$NH_2$) diethylenetriamine (DETA; $NH_2$—$(CH_2)_2$—NH—$(CH_2)_2$—$NH_2$), alanine (Ala; $NH_2$—$C(CH)_3$—COOH), glutamic acid (Glu; COOH—$(CH_2)_2$—CH—$(NH_2)$—COOH), triethylenetetramine (TETA; $NH_2$—$(CH_2)_2$—NH—$(CH_2)_2$—NH—$(CH_2)_2$—$NH_2$) be selected.

In the present invention, however, the additive is not limited to the above amino organic materials. Further, an organic material simply containing the element X (X is at least one element selected from the group of O, C, N and S) may be employed in place of the amino organic materials. In short, in the manufacture of the soft magnetic film used as at least one the lower core layer 5 and the upper core layer 10, any organic material may be added to the plating bath, in addition to Fe ions and Ni ions, so long as the soft magnetic film formed contains at least Fe, Ni and the element X as the composition elements thereof, the average grain size thereof is 80 Å or less and further the amount of Fe is 30 percent by mass or more. As to the element O, it is contemplated that when oxygen remains in the plating bath, oxygen can be contained in the soft magnetic film by forming it by plating in the plating bath.

Further, in the present invention, it is preferable that saccharin ($C_7H_5NO_3S$) be added in the plating bath.

The addition of saccharin permits the element X to be properly contained in the soft magnetic film by the multiplier effect of the saccharin and the amino organic materials. It is contemplated that a proper amount of O can be contained in the soft magnetic film by the addition of the saccharin because saccharin contains O (oxygen).

Further, the stress of the soft magnetic film obtained by the plating is reduced by the addition of the saccharin to the plating bath, the use of the soft magnetic film in at least one of the lower core layer 5 and the upper core layer 10 can properly prevent the exfoliation of the film of the lower core layer 5 and/or the upper core layer 10.

Furthermore, in the present invention, it is preferable to contain S (sulfur) in the composition of the soft magnetic film as described above because the resistivity ρ can be more improved. It, and it is contemplated that the sulfur can be contained in the composition of the soft magnetic film by the use of an amino organic material containing sulfur and further by the addition of saccharin in the plating bath as described above.

It is contemplated that since saccharin contains sulfur in the composition thereof, sulfur is contained in the soft magnetic film by the multiplier effect of the saccharin and the amino organic material when a proper amount of the saccharin is added or when the amino organic material is properly added. It has been confirmed in the experiment to be described later that sulfur is contained in a soft magnetic film obtained in a plating bath in which both saccharin and an amino organic material are contained.

Further, in the present invention, the average roughness (Ra) of the centerline of the film surface of the soft magnetic film is reduced and the occurrence of the surface roughness of the film surface is suppressed by properly setting the various conditions of the plating bath containing Fe ions and Ni ions when the amino organic material is added to the plating bath.

In the present invention, it is preferable that the pH (index for the hydrogen ion concentration) of the plating bath be set to 1.8 or less. An increase in the pH of the plating bath increases the average roughness (Ra) of the centerline of the film surface of the soft magnetic film having been formed. It has been confirmed by the experiment to be described later that a coercive force Hc is increased by the increase in the average roughness (Ra) of the centerline.

In the present invention, it is preferable that the pH of the plating bath be set to 1.8 or less and that the average roughness (Ra) of the centerline of the soft magnetic film be set to 140 Å or less.

Further, in the present invention, it is more preferable that the pH of the plating bath be set to 1.7 or less and that the average roughness (Ra) of the centerline of the soft magnetic film be set to 120 Å or less, and it is furthermore preferable that the pH of the plating bath be set to 1.5 or less and that the average roughness (Ra) of the centerline of the soft magnetic film be set to 50 Å or less.

Further, the average roughness (Ra) of the centerline of the soft magnetic film is influenced not only by the pH of the plating bath but also by the temperature of the plating bath. Accordingly, in the present invention, the temperature of the plating bath is set within a proper range, specifically, within the range of from 20° C. to 28° C., where the average roughness (Ra) of the centerline of the soft magnetic film can be properly reduced within the above numerical values and the coercive force Hc can be reduced thereby.

In the present invention, how a state of the film surface of a soft magnetic film was varied was examined when the pH and the temperature of a plating bath were changed.

In the experiment, soft magnetic films were formed by electric plating in a plating bath which included $Fe^{2+}$ ions (2.5 g/l) and $Ni^{2+}$ ions (40 g/l) and to which 630 ppm of ethylenediamine was added in a case in which the pH and temperature of the plating bath were set to 1.5 and 20° C., respectively and in a case in which the pH and temperature thereof were set to 3.0 and 28° C., respectively. Then, the states of the film surfaces of the respective soft magnetic films were examined by photographs taken by SEM.

Figure 15:
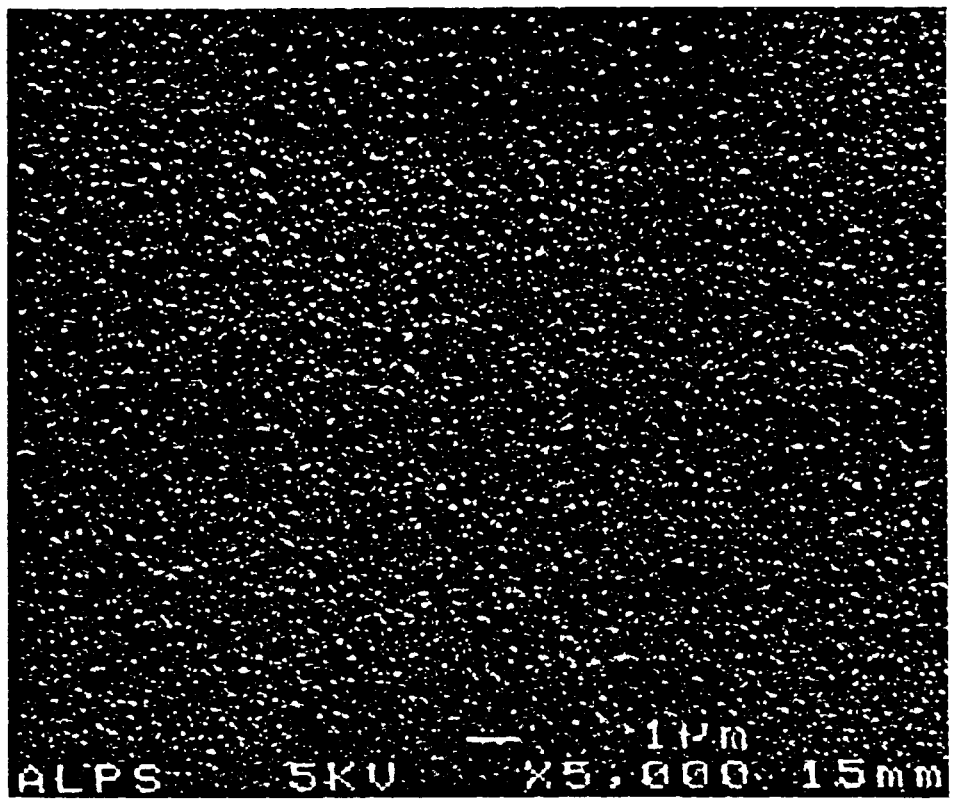
FIG. 15 shows a photograph taken by SEM which illustrates a state of the film surface of a soft magnetic film when the pH of a plating bath was set to 1.5 and the temperature thereof was set to 20° C.

FIG. 15 shows the state of the film surface of a soft magnetic film when the pH and temperature of the plating bath were set to 1.5 and 20° C., respectively. As shown in FIG. 15, the film surface is not almost roughed and the soft magnetic film having a metallic gloss can be obtained.

Figure 16:
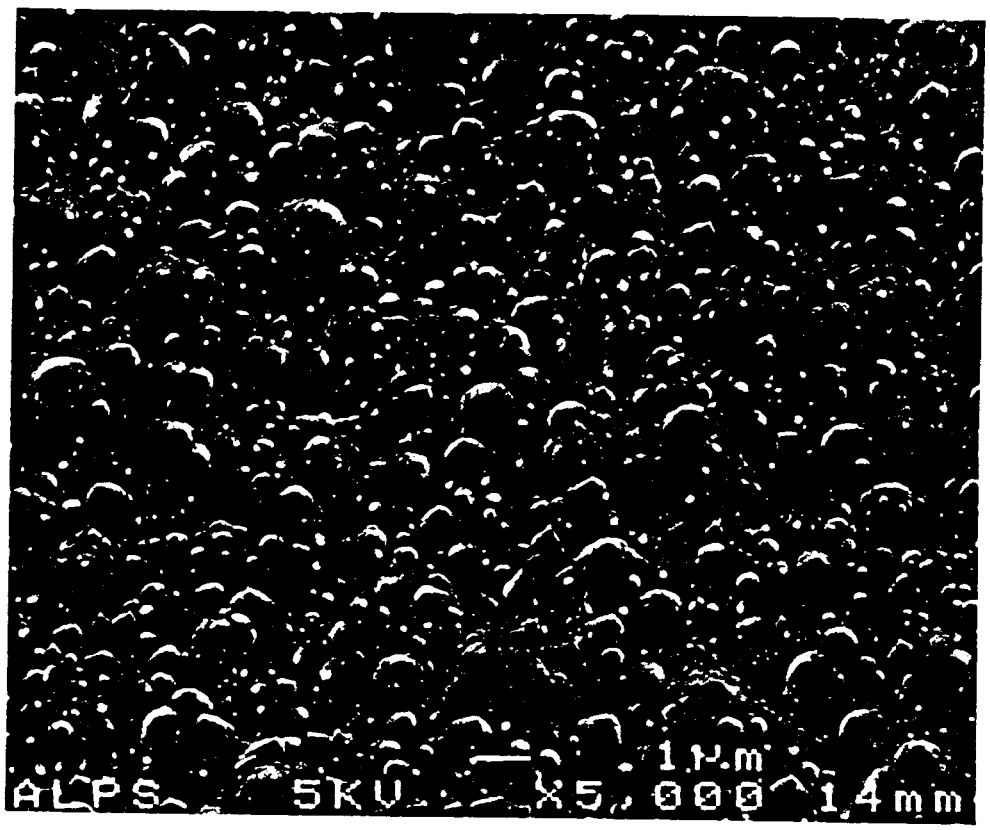
FIG. 16 shows a photograph taken by SEM which illustrates a state of the film surface of a soft magnetic film when the pH of the plating bath was set to 3.0 and the temperature thereof was set to 28° C.

Next, FIG. 16 shows the state of the film surface of a soft magnetic film when the pH and temperature of the plating bath were set to 3.0 and to 28° C., respectively.

As shown in 16, it can be found that the film surface of the soft magnetic film is greatly roughed as compared with that shown in FIG. 15.

Note that the average roughness (Ra) of the centerline of the film surface of the soft magnetic film shown in FIG. 15 is about 40 nm, whereas the average roughness (Ra) of the centerline of the film surface of the soft magnetic film shown in FIG. 16 is about 200 nm. Further, the amount of Fe contained in the soft magnetic film of FIG. 15 is 57 percent by mass (the amount of Ni=43 percent by mass), whereas the amount of Fe contained in the soft magnetic film of FIG. 16 is 52 percent by mass (the amount of Ni=48 percent by mass).

As described above, the reason why the average roughness (Ra) of the centerline of the film surface of the soft magnetic film formed by the plating in FIG. 15 is greatly different from that of the soft magnetic film in FIG. 16, regardless of that the additive amounts of Fe ions and Ni ions and the aditive amounts of ethylenediamine which are contained in the plating baths are the same, is that the pHs and temperatures of the plating baths are different. As apparent from the photographs shown in FIGS. 15 and 16, the the average roughness (Ra) of the centerline of a soft magnetic film can be more reduced and the occurrence of a roughed surface can be suppressed by reducing the pH of the plating bath and further lowering the temperature thereof.

As described above, in the present invention, the addition of the amino organic material to the plating bath containing Fe ions and Ni ions permits a soft magnetic film to be formed which contains at least Fe and Ni and further the element X (X is at least one element selected from the group of O, C, N, and S) as the composition elements.

It is preferable in the present invention to add saccharin to the plating bath in addition to the amino organic material, whereby the resistivity $\rho$ of a resultant soft magnetic film can be more improved. Furthermore further a disadvantage such as the exfoliation of a film and the like can be properly prevented by properly reducing stress.

In the present invention, it is preferable that sulfur be contained in the resultant soft magnetic film, whereby the resistivity $\rho$ of the soft magnetic film can be more improved.

In the present invention, a film forming rate can be delayed and the average roughness (Ra) of the centerline of the film surface of a soft magnetic film formed by plating can be reduced by reducing the pH of the plating bath and setting a proper temperature to the plating bath.

Further, the addition of the amino organic material to the plating bath containing Fe ions and Ni ions can accelerate the deposition of Fe and reduce the precipitation of Fe ions due to oxidation. As a result, a soft magnetic film containing a large amount of Fe can be formed by plating in a plating bath having a low concentration of Fe. A filter is disposed in the plating bath to remove precipitated Fe. In the present invention, however, since the precipitation of Fe ions can be reduced as described above, the life of the filter can be increased and the deterioration of the plating bath can be suppressed.

The soft magnetic film containing at least Fe and Ni and further the element X (X is at least one element selected from the group of O, C, N, and S) has been described in the present invention. It is contemplated, however, that soft magnetic characteristics substantially the same as those of the soft magnetic film containing the element X as the composition elements can be obtained by a soft magnetic film to which other non-metallic element is added in place of the above additive elements.

Exemplified as the soft magnetic film are, for example, a soft magnetic film which contains Fe and Ni and further an element P (phosphorus) as the composition elements by selecting phosphorous acid ($H_3PO_3$) and hypophosphorous acid ($H_3PO_2$) as an additive element to be added to a plating bath containing Fe ions and Ni ions and a soft magnetic film to which a non-metallic element such as an element B (boron) and the like is added.

EXAMPLES

In the present invention, various amino organic materials were added to a plating bath containing Fe ions and Ni ions and the relationship between the additive amount of the amino organic materials and the resistivity $\rho$ of a soft magnetic film formed by plating was examined.

Figure 2:
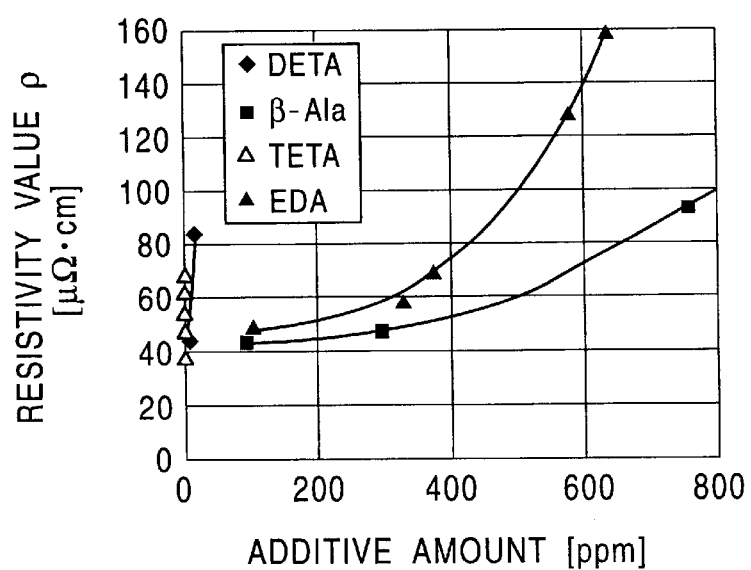
FIG. 2 is a graph showing the relationship between the additive amounts of various amino organic materials added to a plating bath having Fe ions and Ni ions and the resistivity ρ of each of soft magnetic films obtained from the plating bath.

In an experiment, etylenediamine (EDA), diethylenetriamine (DETA), tritehylenetetramine (TETA) and β-alanine (β-Ala) were used as the amino organic materials and the resistivity $\rho$ of each of soft magnetic films to which the respective amino organic materials were added was examined. Note that the pH and temperature of the plating bath were set to 1.5 and 20° C., respectively. Further, $Fe^{2+}$ ions and $Ni^{2+}$ ions contained in the plating bath were set to 2.5 g/l and 40 g/l, respectively. FIG. 2 shows the result of the experiment.

As shown in FIG. 2, it can be found that the resistivity $\rho$ will be increased by an increase in an additive amount of each amino organic material. It is contemplated that the reason why the resistivity $\rho$ is changed when a different amino organic material is added as shown in FIG. 2 is that each amino organic material has a different molecular weight. As shown in FIG. 2, it can be found that an amino organic material having a higher molecular weight (TETA and DETA) can abruptly increase the resistivity $\rho$ even if it is added in a small amount.

Table 1 shows soft magnetic characteristics measured as to respective soft magnetic films which were formed in a plating bath containing Fe ions and Ni ions by adding etylenediamine (EDA) diethylenetriamine (DETA), tritehylenetetramine (TETA) and alanine (Ala) to the plating bath as the amino organic materials. Further, Table 1 also shows the soft magnetic characteristics of a soft magnetic film which contained an element P by adding hypophosphorous acid ($H_3PO_2$) to the plating bath containing Fe ions and Ni ions.

TABLE 1

| Additive (Additive amount: ppm) | Fe amount (mass %) | Resistivity $\rho$ ($\mu\Omega \cdot cm$) | Coercive force Hc (A/m) | Saturation magnetic flour density (T) | Stress $\sigma$ (Mpa) |
| --- | --- | --- | --- | --- | --- |
| EDA (630) | 57 | 160 | 63.2 | 1.3 | 160 |
| DETA (20) | 58 | 85 | 79 | 1.5 | 200 |
| TETA (20) | 57 | 70 | 63.2 | 1.4 | 330 |
| β-Ala (760) | 65 | 91 | 63.2 | 1.4 | 270 |
| Hypophosphorous acid (40) | 50 | 100 | 118.5 | 1 | 670 |

Each soft magnetic film formed by adding amino organic materials exhibits a resistivity $\rho$ of 60 $\mu\Omega$·cm or more, a coercive force Hc of 79 A/m or less and further a saturation magnetic flux density Ms of 1.0 T or more. Further, the stress thereof is suppressed to a low level.

Further, it can be found that the soft magnetic film formed by adding hypophosphorous acid ($H_3PO_2$) also has good soft magnetic characteristics similarly.

Figure 3:
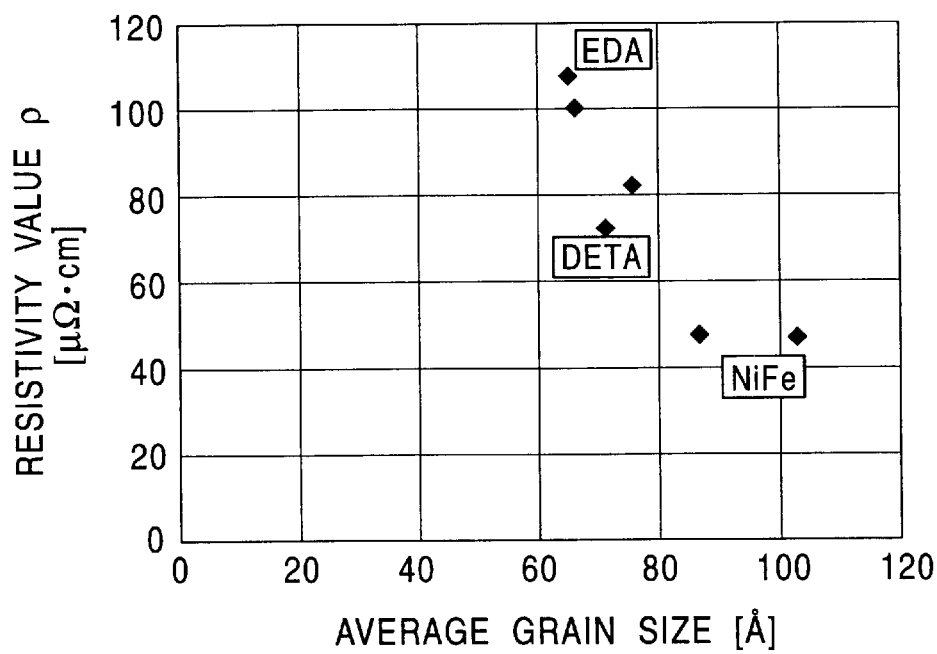
FIG. 3 is a graph showing the relationship between the average grain size of each of soft magnetic films obtained by selecting ethylenediamine (EDA) and diethylenetriamine (DETA) as the amino organic materials and the resistivity ρ thereof.

FIG. 3 shows the result of examination of the relationship between the average grain size of each of soft magnetic films which were formed in a plating bath to which ethylenediamine (EDA) and diethylenetriamine (DETA) were added as the amino organic materials and the resistivity $\rho$ thereof. The average grain size is a value measured from the half-value width of a profile diffracted with X-ray diffraction. Further, the relationship between the average grain size of a Ni—Fe alloy to which no amino organic material was added and the resistivity ρ also was examined as a comparative example. Ethylenediamine (EDA) was added in an amount of about 600 ppm and diethylenetriamine (DETA) was added in an amount of about 20 ppm. The respective conditions of the plating bath were the same as those of FIG. 2.

As shown in FIG. 3, it can be found that the average grain sizes of the soft magnetic films to which ethylenediamine (EDA) and diethylenetriamine (DETA) were added are smaller than that of the Ni—Fe alloy film to which no amino organic material was added. Then, a smaller average grain size can more increase the resistivity ρ.

As described above, the average grain size can be miniaturized by adding the amino organic materials such as ethylenediamine (EDA), diethylenetriamine (DETA) and the like. In the present invention, the average grain size is set preferably to 80 Å or less and more preferably within the range of from 60 Å to 80 Å from the result of the experiment shown in FIG. 3.

It can be found from the result of the experiment shown in FIGS. 2 and 3 that the resistivity ρ can be set to 60 $\mu\Omega$·cm or more in the present invention by properly setting the average grain size by the addition of the amino organic materials. Note that it is more preferable to set the resistivity ρ to 80 $\mu\Omega$·cm or more and it is furthermore preferable to set it to 100 $\mu\Omega$·cm or more.

Figure 4:
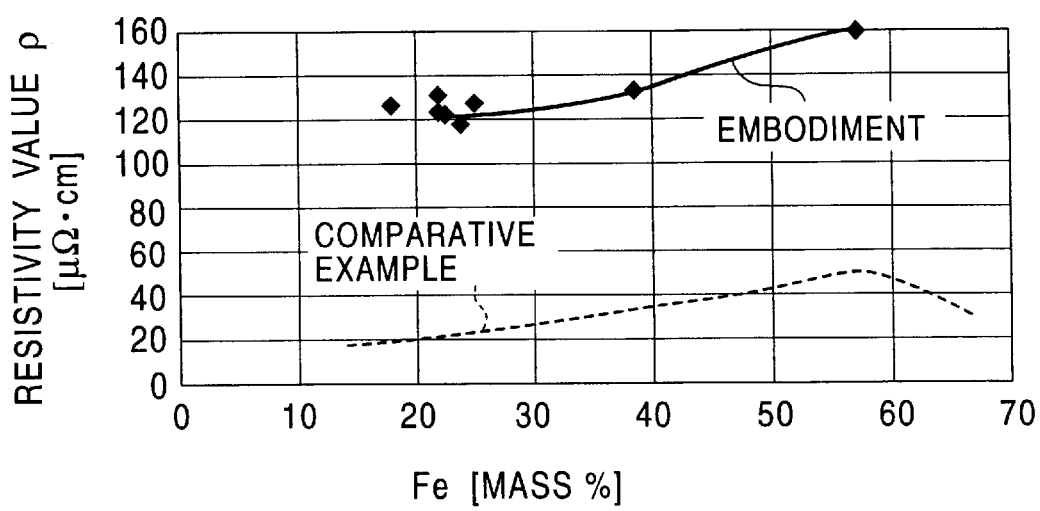
FIG. 4 is a graph showing the relationship between the amount of Fe in a soft magnetic film obtained by selecting ethylenediamine (EDA) as the amino organic material and the resistivity ρ thereof and the relationship between the amount of Fe in a Ni—Fe alloy film and the resistivity ρ thereof.
Figure 5:
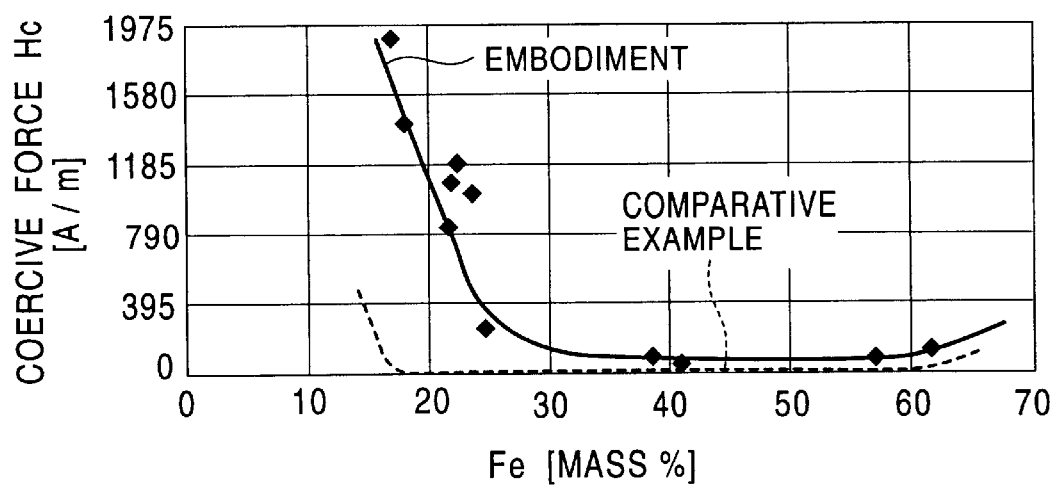
FIG. 5 is a graph showing the relationship between the amount of Fe in the soft magnetic film obtained by selecting ethylenediamine (EDA) as the amino organic material and the coercive force Hc thereof and the relationship between the amount of Fe in the Ni—Fe alloy film and the coercive force Hc thereof.
Figure 6:
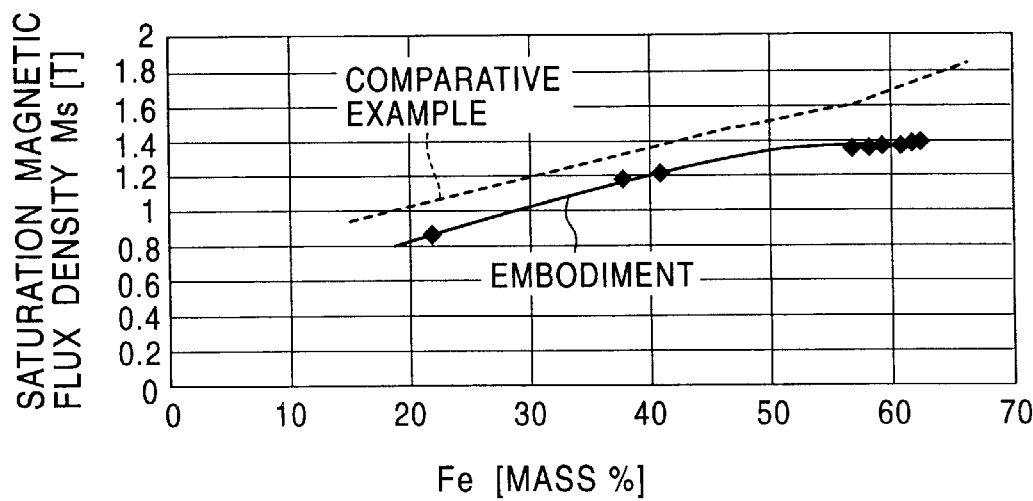
FIG. 6 is a graph showing the relationship between the amount of Fe in the soft magnetic film obtained by selecting ethylenediamine (EDA) as the amino organic material and the saturation magnetic flux density Ms thereof and the relationship between the amount of Fe in the Ni—Fe alloy film and the saturation magnetic flux density Saturation magnetic flux density Ms thereof.

FIG. 4 to FIG. 6 are graphs showing the relationship between the amount of Fe contained in each of soft magnetic films and the respective soft magnetic characteristics thereof. In the experiment, the soft magnetic films containing a different amount of Fe were formed by plating by adding about 600 ppm of ethylenediamine (EDA) in respective plating baths containing Fe ions and Ni ions having a different concentration. The pH and temperature of the respective plating baths were uniformly set to 1.5 and 20° C., respectively.

The dotted lines in FIG. 4 to FIG. 6 show the result of the experiment of a Ni—Fe alloy as a comparative example to which no amino organic material was added.

FIG. 4 is a graph showing the relationship between an amount of Fe and a resistivity ρ. As shown in FIG. 4, it can be found that while the resistivity ρ can be increased by increasing the amount of Fe in both the soft magnetic film (example) to which ethylenediamine (EDA) was added and the Ni—Fe alloy film (comparative example), the example can more improve the resistivity ρ than the comparative example. As described above, this is because that the average grain size of the soft magnetic film (example) was miniaturized by the addition of the amino organic materials.

As shown in FIG. 4, it can be found that when the amount of Fe is set to 30 percent by mass or more, the resistivity ρ can be set to 120 $\mu\Omega$·cm or more.

FIG. 5 is a graph showing the relationship between the amount of Fe and a coercive force Hc. As shown in FIG. 5, the coercive force Hc can be decreased by increasing the amount of Fe in both the soft magnetic film (example) to which ethylenediamine (EDA) was added and the Ni—Fe alloy film (comparative example).

As shown in FIG. 5, it can be found that while the coercive force Hc of the example is somewhat higher than that of the comparative example, when the amount of Fe of the embodiment is set to 30 percent by mass or more, the coercive force Hc of the example is almost unchanged from that of the comparative example.

FIG. 6 is a graph showing the relationship between the amount of Fe and a saturation magnetic flux density Ms. As shown in FIG. 6, the saturation magnetic flux density Ms can be increased by increasing the amount of Fe in both the soft magnetic film (example) to which ethylenediamine (EDA) was added and the Ni—Fe alloy film (comparative example).

As shown in FIG. 6, it can be found that while the saturation magnetic flux density Ms of the example is somewhat lower than that of the comparative example, when the amount of Fe of the example is set to 30 percent by mass or more, the saturation magnetic flux density Ms of 1.0 T (tesla) or more can be obtained in the example.

As described above, it is contemplated that when the average grain size of the soft magnetic film and an amount of Fe contained in the soft magnetic film, which contains at least Fe and Ni and further the element X (X is one or more kinds of elements selected from O, C, N, and S) as the composition elements thereof are properly set, a resistivity ρ higher than that of the Ni—Fe alloy can be obtained in the soft magnetic film and further the soft magnetic film can maintain a coercive force Hc and a saturation magnetic flux density Ms which are as high as those of the Ni—Fe alloy. Specifically, the resistivity ρ can be set to 60 $\mu\Omega$·cm or more.

However, it has been confirmed by the experiment that the resistivity ρ not only depends on the amount of Fe contained in a soft magnetic film formed in a plating bath by plating but also greatly depends on the amounts of the element X and the like contained in the soft magnetic film.

Further, while it is preferable that the soft magnetic film have a higher resistivity ρ because an eddy current loss can be reduced when a recording density is increased in the future, an excessively high value of the resistivity ρ is not desirable. When the resistivity ρ is too high, a problem is arisen in that the saturation magnetic flux density Ms is reduced, the coercive force Hc is increased, and further a magnetic permeability is lowered. As shown in the result of the experiment of FIG. 6, the saturation magnetic flux density Ms of the soft magnetic film of the present invention containing a non-magnetic inorganic material is made smaller than that of the conventional soft magnetic film (Ni—Fe alloy) to which the non-magnetic inorganic material was not added. However, it is necessary that the saturation magnetic flux density Ms be maintained to 1.0 T (tesla) or more to minimize the reduction of the saturation magnetic flux density Ms and to effectively maintain recording characteristics.

Thus, in the present invention, an experiment was performed to examine the relationship between the composition ratios of O, C, and S contained in a soft magnetic film and the resistivity ρ thereof to improve the resistivity ρ while preventing the extreme reduction of the saturation magnetic flux density Ms when the recording density is increased in the future.

TABLE 2

Common film forming conditions

| Ground | Bath [g/l] | | | | | | pH | Temperature [° C.] | Current density [mA/cm²] | Time [min] |
| --- | --- | --- | --- | --- | --- | --- | --- | --- | --- | --- |
| | MiSO₄ | MiCl₂ | FeSO₄ | NaCl | H₃BO₃ | Lauryl sulfuric acid | | | | |
| PB3 | 50 | 117 | 13 | 25 | 25 | 0.02 | 2.5 | 25 | 29.3 | 10 |

| Speci-men No. | Additive amt. | | Analyzed value of composition (mass %) | | | | | | O + C + S | (O/ Fe + Nl) | Value of physical properties | | | Magnetic characteristics | | | |
| --- | --- | --- | --- | --- | --- | --- | --- | --- | --- | --- | --- | --- | --- | --- | --- | --- | --- |
| | EDA [ppm] | Sac-charin Na [g/L] | Fe | Nl | O | C | S | Cl | | | Film thick-ness [μm] | Stress [Mpa] | Resis-tivity [μΩ·cm] | Mag (wafer size) | | | |
| | | | | | | | | | | | | | | Hce [A/m] | Mse [A/m] | Hch [A/m] | Msh [A/m] |
| 0 | 0 | 2 | 50.00 | 50.00 | — | — | — | — | — | — | | | 40 | | | | |
| 1 | 400 | 0.5 | 53.40 | 46.34 | — | — | 0.14 | 0.12 | — | — | 2.33 | 337 | 90 | 200.66 | 105.85 | 89.27 | 107.44 |
| 2 | 400 | 0.5 | 53.51 | 44.61 | 1.19 | 0.48 | 0.13 | 0.08 | 1.80 | 0.01 | 2.33 | 564 | 89 | | | | |
| 3 | 600 | 0.5 | 53.27 | 43.33 | 2.50 | 0.64 | 0.14 | 0.12 | 3.29 | 0.03 | 2.33 | 280 | 112 | 267.02 | 95.59 | 164.32 | 97.17 |
| 4 | 600 | 0.5 | 48.31 | 48.44 | 2.48 | 0.47 | 0.18 | 0.12 | 3.13 | 0.03 | 2.33 | 505 | 107 | | | | |
| 5 | 600 | 1 | 52.89 | 43.89 | 2.45 | 0.39 | 0.29 | 0.09 | 3.13 | 0.03 | 2.20 | 304 | 126 | 237.79 | 97.96 | 117.71 | 99.54 |
| 6 | 600 | 1 | 50.00 | 47.47 | 1.81 | 0.42 | 0.19 | 0.12 | 2.42 | 0.02 | 2.20 | 486 | 117 | | | | |
| 7 | 600 | 2 | 51.76 | 44.44 | 2.99 | 0.43 | 0.31 | 0.08 | 3.72 | 0.03 | 2.12 | 227 | 151 | 391.05 | 97.17 | 136.67 | 98.95 |

The column "ADDITIVE AMOUNT" in Table 2 shows the common film forming conditions used in the experiment shows the additive amounts of ethylenediamine (EDA) and saccharin contained in the plating bath of each of specimens used in the experiment.

Further, the column "ANALYZED VALUE OF COMPOSITION" in Table 2 shows the result of analysis by EMPA of the composition of the elements contained in a soft magnetic film formed by plating in each of the specimens.

Further, the column "VALUE OF PHYSICAL PROPERTIES" in Table 2 shows the film thickness, stress and resistivity ρ of the soft magnetic film formed by plating in each of the specimens.

Further, the column "MAGNETIC-CHARACTERISTICS" in Table 2 shows the coercive force Hc and saturation magnetic flux density Ms of the soft magnetic film formed by plating in each of the specimens. Note that "Hce" shows the coercive force in an easy axis direction, "Hch" shows the coercive force in a difficult axis direction, "Mse MAGNETIC FLUX DENSITY Msh" shows the magnetic flux density in the easy axis direction, and "Msh" shows the saturation magnetic flux density in the difficult axis direction, respectively.

Further, the additive amounts of Fe compound and the like to be added to each of the plating baths, the pH and the like are common to each of the specimens and these conditions are as shown below.
The Conditions Common to Plating Baths are as Follow
  additive amount of NiSO₄; 50 (g/l);
  additive amount of NiCl₂; 117 (g/l);
  additive amount of FeSO₄; 13 (g/l),
  additive amount of NaCl, 25 (g/l),
  additive amount of H₃BO₃, 25 (g/l),
  additive amount of lauryl sulfuric acid, 0.02 (g/l),
  pH of plating bath: 2.5
  temperature of plating bath, 25 C,
  density of current supplied in the electric plating of soft magnetic film, 29.3 mA/cm² and
  plating formation time, 10 min.

Figure 7:
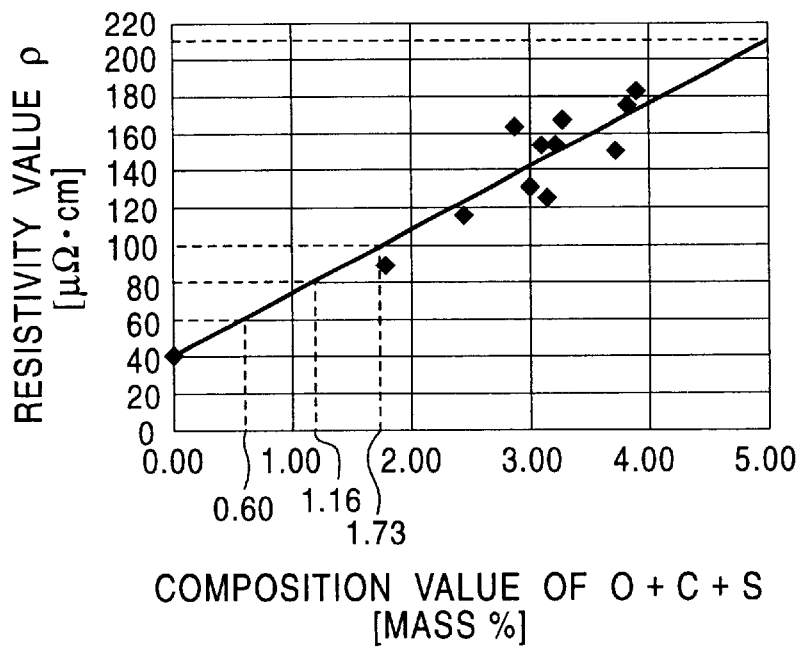
FIG. 7 is a graph showing the composition value of O+C+S contained in a soft magnetic film and the resistivity $\rho$ thereof.

FIG. 7 is a graph showing the relationship between the total composition value (percent by mass) of O, C, and S contained in a soft magnetic film formed by plating and a resistivity ρ.

As shown in FIG. 7, it can be found that the resistivity ρ will be linearly improved by an increase in the composition ratio (percent by mass) of O+C+S.

In the present invention, it is preferable that the resistivity ρ be set to 60 μΩ·cm or more. Accordingly, it is preferable in the present invention that the composition ratio of O+C+S be set to 0.6 (percent by mass) or more.

However, it is not good that the resistivity ρ be as high as possible. A problem of the reduction of the saturation magnetic flux density Ms will be caused by an increase in the resistivity ρ conversely. Thus, the upper limit value of the resistivity ρ is determined so that the saturation magnetic flux density Ms is set to 1.0 T (tesla) or more in the present invention. Specifically, it is preferable that the resistivity ρ be 210 μΩ·cm or less.

As shown in Table 2, it can be found that the saturation magnetic flux density Msh (saturation magnetic flux density in the difficult axis) is set to 1.0 T (tesla) or more in any of the specimens.

As shown in FIG. 7, the composition value of O+C+S is 5.00 (percent by mass) when the resistivity ρ is set to 210 μΩ·cm. Therefore, in the present invention, the preferable range of the composition value of O+C+S is set to 0.60 (percent by mass) or more to 5.00 (percent by mass) or less.

Figure 8:
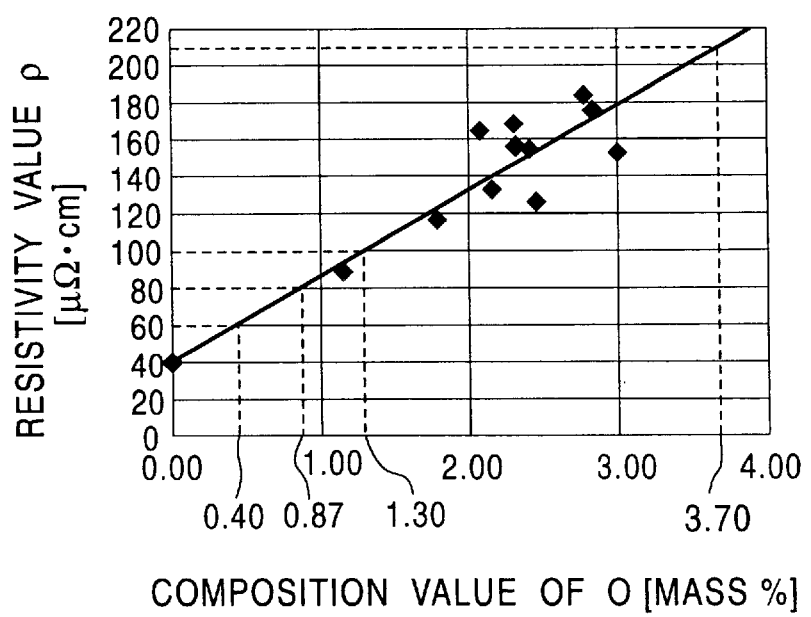
FIG. 8 is a graph showing the relationship between the composition value of O contained in the soft magnetic film and the resistivity $\rho$ thereof.
Figure 9:
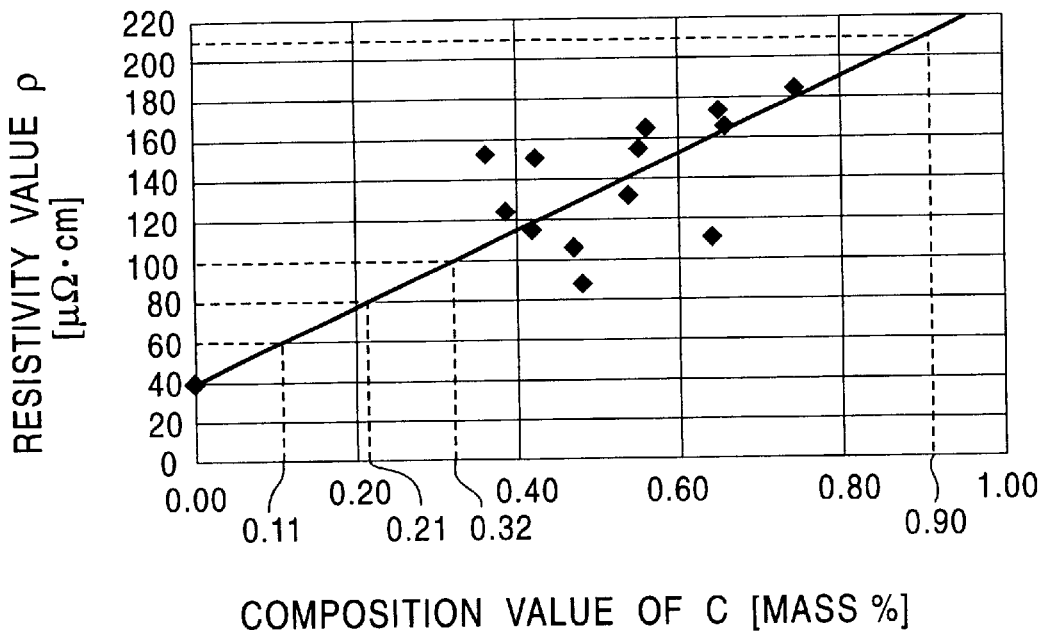
FIG. 9 is a graph showing the relationship between the composition value of C contained in the soft magnetic film and the resistivity $\rho$ thereof.
Figure 10:
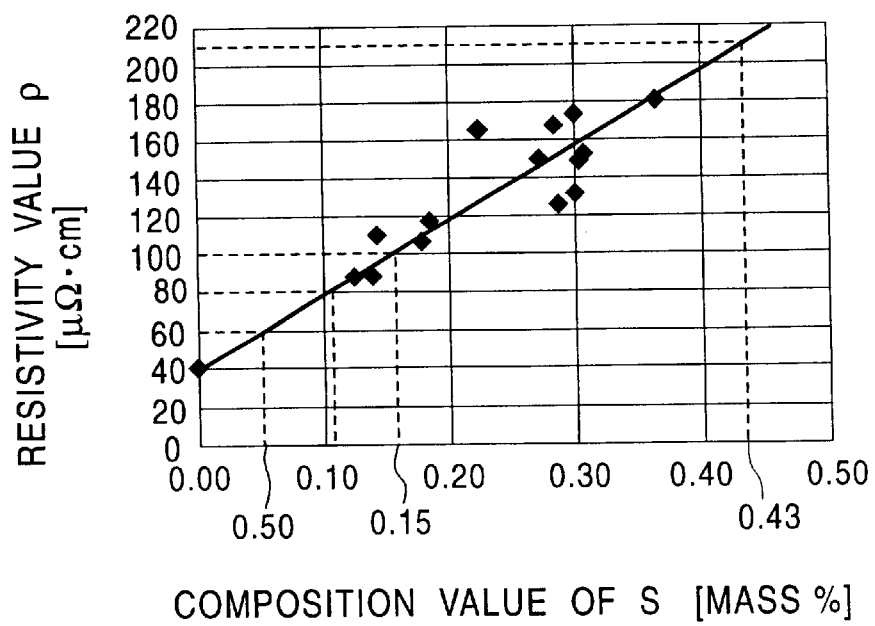
FIG. 10 is a graph showing the relationship between the composition value of S contained in the soft magnetic film and the resistivity $\rho$ thereof.

However, as shown in the graphs of FIG. 8 to FIG. 10, this does not mean that O, C, and S may be set to any composition ratio within the range of the above numerical values and each element of O, C, and S has a proper range of composition when the resistivity ρ is set to 60 μΩ·cm or more to 210 μΩ·cm or less.

FIG. 8 is a graph showing the relationship between the composition value (percent by mass) of O contained in the soft magnetic film and the resistivity ρ. It can be found from the graph that the resistivity ρ can be linearly improved by an increase in the composition ratio of O similarly to FIG. 7.

It can be found from the graph that the resistivity ρ of the soft magnetic film can be set to 60 μΩ·cm or more to 210 μΩ·cm or less by setting the composition ratio of O contained in the soft magnetic film to 0.40 percent by mass or more to 3.70 percent by mass or less.

FIG. 9 is a graph showing the relationship between the composition value (percent by mass) of C contained in the soft magnetic film and the resistivity ρ. It can be found from the graph that the resistivity ρ can be linearly improved by an increase in the composition ratio of C similarly to FIGS. 7 and 8.

It can be found from the graph that the resistivity ρ of the soft magnetic film can be set to 60 μΩ·cm or more to 210 μΩ·cm or less by setting the composition ratio of C contained in the soft magnetic film to 0.11 percent by mass or more to 0.90 percent by mass or less.

FIG. 10 is a graph showing the relationship between the composition value (percent by mass) of S contained in the soft magnetic film and the resistivity ρ. It can be found from the graph that the resistivity ρ can be linearly improved by an increase in the composition ratio of S similarly to FIG. 7 to FIG. 9.

It can be found from the graph that the resistivity ρ of the soft magnetic film can be set to 60 μΩ·cm or more to 210 μΩ·cm or less by setting the composition ratio of S contained in the soft magnetic film to 0.05 percent by mass or more to 0.43 percent by mass or less.

In the present invention, it is preferable that the resistivity ρ be set to 80 μΩ·cm or more. It is contemplated that since the resistivity ρ is conventionally about 40 μΩ·cm, the provision of the resistivity ρ which is twice as large as the conventional resistivity ρ permits a thin film magnetic head, which will be more applicable to an increase in the recording density in the future, to be manufactured.

As shown in FIG. 7, it can be found that the resistivity ρ of the soft magnetic film can be set to 80 μΩ·cm or more to 210 μΩ·cm or less by setting the composition value of O+C+S contained in the soft magnetic film to 1.16 percent by mass or more to 5.00 percent by mass or less.

As shown in FIG. 8, the resistivity ρ of the soft magnetic film can be set to 80 μΩ·cm or more to 210 μΩ·cm or less by setting the composition ratio of O contained in the soft magnetic film to 0.87 percent by mass or more to 3.70 percent by mass or less in this case.

As shown in FIG. 9, the resistivity ρ of the soft magnetic film can be set to 80 μΩ·cm or more to 210 μΩ·cm or less by setting the composition ratio of C contained in the soft magnetic film to 0.21 percent by mass or more to 0.90 percent by mass or less.

As shown in FIG. 10, the resistivity ρ of the soft magnetic film can be set to 80 μΩ·cm or more to 210 μΩ·cm or less by setting the composition ratio of S contained in the soft magnetic film to 0.10 percent by mass or more to 0.43 percent by mass or less.

In the present invention, it is more preferable that the resistivity ρ of the soft magnetic film be set to 100 μΩ·cm or more.

As shown in FIG. 7, it can be found that the resistivity ρ of the soft magnetic film can be set to 100 μΩ·cm or more to 210 μΩ·cm or less by setting the composition value of O+C+S contained in the soft magnetic film to 1.73 percent by mass or more to 5.00 percent by mass or less.

As shown in FIG. 8, the resistivity ρ of the soft magnetic film can be set to 100 μΩ·cm or more to 210 μΩ·cm or less by setting the composition ratio of O contained in the soft magnetic film to 1.30 percent by mass or more to 3.70 percent by mass or less in this case.

Further, as shown in FIG. 9, the resistivity ρ of the soft magnetic film can be set to 100 μΩ·cm or more to 210 μΩ·cm or less by setting the composition ratio of C contained in the soft magnetic film to 0.32 percent by mass or more to 0.90 percent by mass or less.

Furthermore, as shown in FIG. 10, the resistivity ρ of the soft magnetic film can be set to 100 μΩ·cm or more to 210 μΩ·cm or less by setting the composition ratio of S contained in the soft magnetic film to 0.15 percent by mass or more to 0.43 percent by mass or less.

All of the composition value of the O+C+S, the composition value of O, the composition value of C, and the composition value of S of the soft magnetic film of each of the specimens Nos. 2 to 14 are set within the ranges of the above numerical values.

As shown in Table 2, it can be found that each of the soft magnetic films formed by plating from the specimens Nos. 2 to 14 contains 30 percent by mass or more of Fe in the composition thereof. Further, it can be found that the ratio O/(Fe+Ni) (%) is not almost changed in any of the specimens. This means that if the soft magnetic film contains only O and is not added with C and S, the resistivity ρ cannot be properly improved. Thus, it is contemplated that the resistivity ρ can be improved to such a degree that it can cope with the increase in the recording density in the future by containing O and further C and S in the soft magnetic film.

Figure 11:
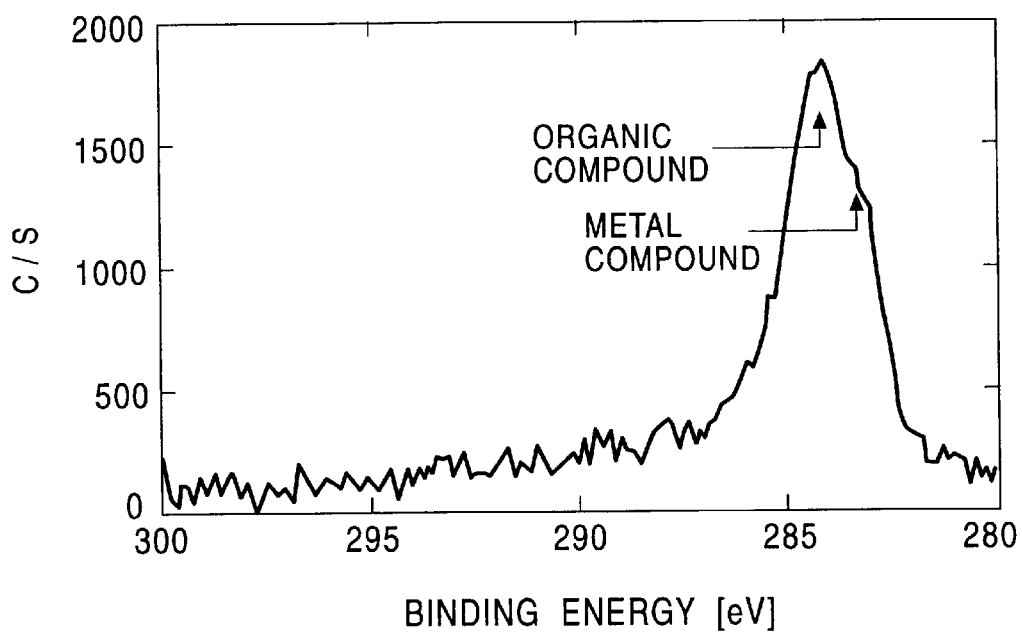
FIG. 11 is a graph showing the result of analysis with ESCA of the chemical bonding state of C contained in a soft magnetic film formed by plating under predetermined conditions.
Figure 12:
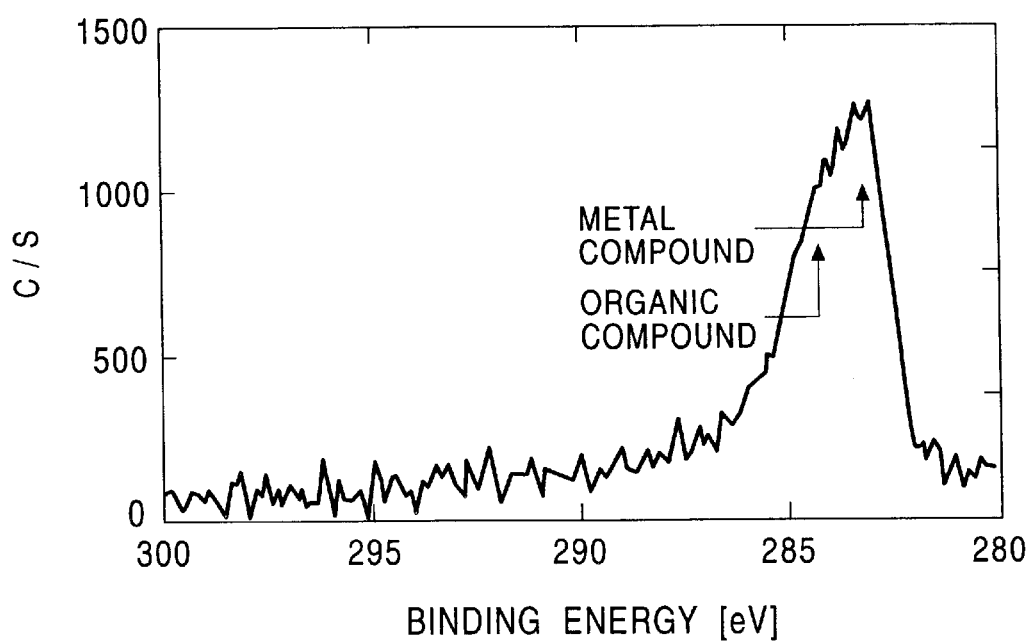
FIG. 12 is a graph showing the result of analysis with ESCA of the chemical bonding state of C contained in a soft magnetic film formed by plating under predetermined conditions.

FIGS. 11 and 12 show the result of the experiment for analyzing the chemical bonding state of C (carbon) contained in a soft magnetic film by means of ESCA.

FIG. 11 shows the result of the experiment for analyzing the chemical bonding state of C contained in the above soft magnetic film when it was formed by plating in a plating bath to which 3.0 g/l of saccharin and 800 ppm of ethylenediamine (EDA) were added. Note that the thus formed soft magnetic film was not subjected to heat treatment.

The result of the analysis of the composition of the soft magnetic film shows that it contains 57 percent by mass of Fe, 39 percent by mass of Ni, and 3 percent by mass of O. Note that the composition ratio of C could not be measured.

FIG. 12 shows the result of the analysis for analyzing the chemical bonding state of C contained in a soft magnetic film when it was formed by plating in the plating bath to which 3.0 g/l of saccharin and 800 ppm of ethylenediamine (EDA) were added. Note that the thus formed soft magnetic film was subjected to heat treatment.

The result of the analysis of the composition of the soft magnetic film shows that it contains 1 percent by mass of C, 54 percent by mass of Fe, 41 percent by mass of Ni, and 3 percent by mass of O.

Both FIGS. 11 and 12 show the peak of C1s (1s electrons of carbon) in the vicinity of bond energy 284 eV.

The peak, which is shown when bond energy is about 284 (eV), means that C is in the state of an organic compound; A a peak, which is shown when bond energy is about 283 (eV), means that C is in the state of a metal compound (which is assumed to be, for example, $Fe_3C$ and $Ni_3C$).

That is, as apparent from the result of the experiment, it can be contemplated that C is contained in the soft magnetic film as the organic compound and/or the metal compound.

Next, the relationship between the pH of a plating bath and the average roughness (Ra) of the centerline of a soft magnetic film formed by plating and the relationship between the average roughness (Ra) of the centerline and the coercive force (Hc) were examined.

It can be found from result of the experiment shown below that while the coercive force depends on an amount of Fe as described in FIG. 5, even if the amount of Fe is optimized, the coercive force Hc is actually increased by an increase in the pH of the plating bath.

Figure 13:
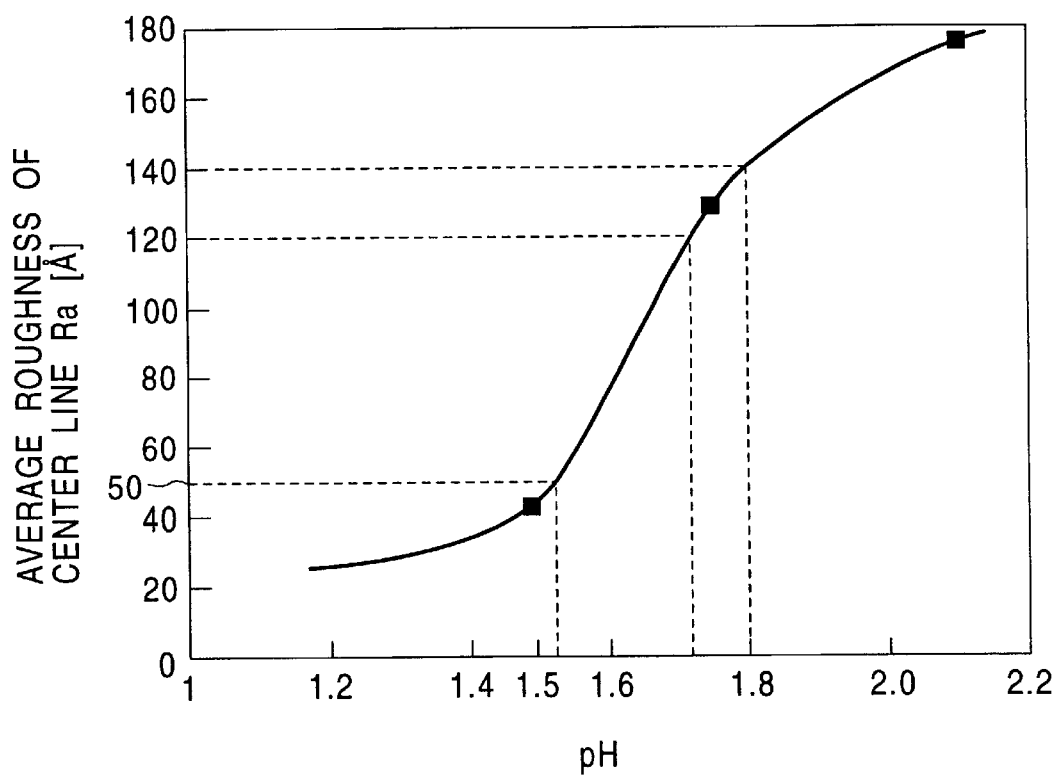
FIG. 13 is a graph showing the relationship between the pH of a plating bath in which ethylenediamine (EDA) was selected as the amino organic material and the average roughness (Ra) of the centerline of the film surface of a resultant soft magnetic film.

FIG. 13 is a graph showing the relationship between the pH of the plating bath which contains Fe ions and Ni ions and to which ethylenediamine (EDA) is added and the average roughness (Ra) of the centerline of the film surface of a soft magnetic film formed by plating in the plating bath. In the experiment, the temperature of the plating bath was set to 20° C.

As shown in FIG. 13, it can be found that an increase in the pH of the plating bath will increase the average roughness (Ra) of the centerline of the film surface of the soft magnetic film having been formed by plating. It is contemplated that a cause of it is that a film forming rate is increased by the increase in the pH of the plating bath.

Figure 14:
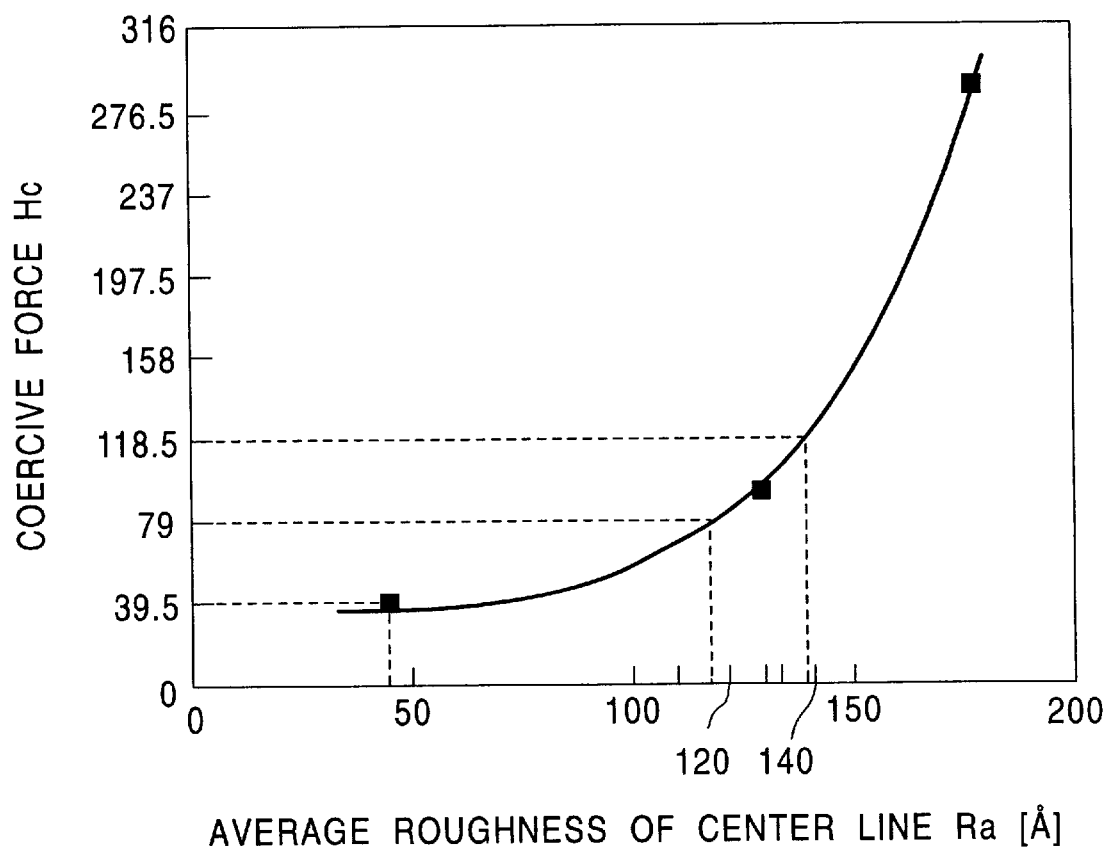
FIG. 14 is a graph showing the relationship between the average roughness (Ra) of the centerline shown in FIG. 13 and a coercive force Hc.

FIG. 14 is a graph showing the relationship between the average roughness (Ra) of the centerline of the film surface of the soft magnetic film and the coercive force Hc.

As shown in FIG. 14, it can be found that the coercive force Hc is increased by an increase in the average roughness (Ra) of the centerline.

That is, it can be found from the result of the experiment shown in FIGS. 13 and 14 that the average roughness (Ra) of the centerline of the film surface of the soft magnetic film formed by plating can be reduced by a decrease in the pH of the plating bath and that the coercive force Hc can be suppressed to a low level thereby. Note that it can be contemplated that one of causes that the coercive force Hc can be reduced by the decrease in the average roughness (Ra) of the centerline is the reduction of magnetic anisotropic energy that influences the coercive force Hc.

In the present invention, the preferable range of the coercive force Hc is 118.5 A/m (oersted) or less, the more preferable range thereof is 79 A/m or less, and the furthermore preferable range thereof is 39.5 A/m or less.

It can be found from FIG. 14 that the average roughness (Ra) of the centerline by which the coercive force Hc can be set to 118.5 A/m or less is about 140 Å or less. As shown in FIG. 13, it can be found that the average roughness (Ra) of the centerline can be set to 140 Å or less by setting the pH of the plating bath to 1.8 or less.

Further, it can be found from FIG. 14 that the average roughness (Ra) of the centerline which can set the coercive force Hc to 79 A/m or less is about 120 Å or less. As shown in FIG. 13, it can be found that the average roughness (Ra) of the centerline can be set to 120 Å or less by setting the pH of the plating bath to 1.7 or less.

Furthermore, it can be found from FIG. 14 that the average roughness (Ra) of the centerline by which the coercive force Hc can be set to 39.5 A/m or less is about 50 Å or less. As shown in FIG. 13, it can be found that the average roughness (Ra) of the centerline can be set to 50 Å or less by setting the pH of the plating bath to 1.5 or less.

From the result of the experiments from FIG. 2 to FIG. 14, in the present invention, the average grain size of the soft magnetic film containing at least Fe and Ni and further the element X (X is at least one elements selected from group elements C, O, N, and S) as the compositions elements is set to 80 Å or less and preferably to the range of 60 Å to 80 Å. Furthermore the amount of Fe contained in the soft magnetic film is set to 30 percent by mass or more. With this arrangement, a soft magnetic film, in which the resistivity $\rho$ thereof can be set to 60 $\mu\Omega$·cm or more, can be formed by plating.

Further, in the present invention, the proper setting of the amounts of O, C, and S contained in a soft magnetic film permits the resistivity $\rho$ of the soft magnetic film to be reliably set to 60 $\mu\Omega$·cm or more. Note that since an excessively high resistivity $\rho$ is not preferable because the saturation magnetic flux density Ms is lowered thereby, the upper limit of the resistivity $\rho$ is set to 210 $\mu\Omega$·cm in the present invention.

As described above, it is preferable in the present invention that the composition ratio of O+C+S, which is obtained by adding the composition ratios of O, C, and S, be set to 0.60 percent by mass or more to 3.70 percent by mass or less. At that time, it is preferable that the composition ratio of O be set to 0.40 percent by mass or more to 3.70 percent by mass or less, the composition ratio of C be set to 0.11 percent by mass or more to 0.90 percent by mass or less, and the composition ratio of S be set to 0.05 percent by mass or more to 0.43 percent by mass or less. With this arrangement, the resistivity $\rho$ of the soft magnetic film can be set to 60 $\mu\Omega$·cm or more to 210 $\mu\Omega$·cm or less.

It is preferable in the present invention that the composition ratio of O+C+S, which is obtained by adding the composition ratios of O, C, and S, be set to 1.16 percent by mass or more to 5.00 percent by mass or less. At that time, it is preferable that the composition ratio of O be set to 0.87 percent by mass or more to 3.70 percent by mass or less, the composition ratio of C be set to 0.21 percent by mass or more to 0.90 percent by mass or less, and the composition ratio of S be set to 0.10 percent by mass or more to 0.43 percent by mass or less. With this arrangement, the resistivity $\rho$ of the soft magnetic film can be set to 80 $\mu\Omega$·cm or more to 210 $\mu\Omega$·cm or less.

It is more preferable in the present invention that the composition ratio of O+C+S, which is obtained by adding the composition ratios of O, C, and S, be set to 1.73 percent by mass or more to 5.00 percent by mass or less. At that time, it is preferable that the composition ratio of O be set to 1.30 percent by mass or more to 3.70 percent by mass or less, the composition ratio of C be set to 0.32 percent by mass or more to 0.90 percent by mass or less, and the composition ratio of S be set to 0.15 percent by mass or more to 0.43 percent by mass or less. With this arrangement, the resistivity $\rho$ of the soft magnetic film can be set to 100 $\mu\Omega$·cm or more to 210 $\mu\Omega$·cm or less.

Further, the pH of the plating bath to which Fe ions and Ni ions and further the amino organic materials are added is set to 1.8 or less, preferably to 1.7 or less and more preferably to 1.5 or less. Note that the average roughness (Ra) of the centerline of each of the soft magnetic films formed by plating in correspondence to respective pHs is set to 140 Å or less, 120 Å or less, and 50 Å or less. With this arrangement, the coercive force Hc can be set to 118.5 A/m or less, preferably to 79 A/m or less, and more preferably to 39. 5 A/m or less.

Further, in the soft magnetic film of the present invention, the saturation magnetic flux density Ms can be set to 1.0 T or more.

In the present invention described above in detail, when at least Fe and Ni and further the element X (X is at least one elements selected from the group of O, C, N, and S) are contained in a soft magnetic film as composition elements for constituting it, the average grain size of the soft magnetic film is set to 80 Å or less, and further the amount of Fe contained therein is set to 30 percent by mass or more, the soft magnetic film, which has a resistivity $\rho$, which is higher than that of a Ni—Fe alloy, and a coercive force Hc and a saturation magnetic flux density Ms, which are as high as those of the Ni—Fe alloy, can be formed.

Further, in the present invention, it is preferable that O, C, and S be contained in the soft magnetic film, and the resistivity of the soft magnetic film can be more reliably improved while maintaining the saturation magnetic flux density thereof as high as that of Permalloy and the like as an existing magnetic material by properly adjusting the total composition ratio of O, C, and S and the respective composition ratios of them.

Further, in the present invention, the average roughness (Ra) of the centerline of the film surface of a soft magnetic film formed by plating is reduced by properly setting the pH of a plating bath containing Fe ions and Ni ions when ethylenediamine (EDA) and the like are added to the plating bath, whereby the coercive force Hc of the soft magnetic film can be more properly suppressed to a low level.

As described above, when the soft magnetic film, which has the respective magnetic characteristics of a high resistivity $\rho$, a low coercive force Hc and a high saturation magnetic flux density Ms and contains at least Fe, Ni and the element X (X is at least selected from the group of O, C, N, and S) is used as at least one of elements the upper core layer and/or the lower core layer of a thin film magnetic head, an eddy current loss can be reduced even if a recording frequency is increased. There can be manufactured a thin film magnetic head capable of coping with the increase in the recording density and the increase in the recording frequency in the future.

What is claimed is:

1. A thin film magnetic head, comprising:

a lower core layer;

an upper core layer acting as a surface facing a recording medium which faces the lower core layer through a magnetic gap; and a coil layer for inducing a recording magnetic field to both the core layers, wherein at least one of the upper core layer and the lower core layer is formed of a soft magnetic film comprising Ni, Fe, O, C, and S, wherein the average grain size of the soft magnetic film is less than or equal to 80 Å, and wherein the composition of the soft magnetic film is: Fe is 45.44 percent by mass to 65 percent by mass, the composition ratio of O+C+S which is obtained by adding the composition ratios of O, C, and S is at least 1.73 percent by mass and at most 5.00 percent by mass, wherein the amount of O is at least 1.30 percent by mass and at most 3.70 percent by mass, the amount of C is at least 0.32 percent by mass and at most 0.90 percent by mass, the amount of S is and at least 0.15 percent by mass and at most 0.43 percent by mass, and the balance of the soft magnetic film consists of Ni.

2. A thin film magnetic head according to claim 1, wherein the average grain size is greater than or equal to 60 Å and less than or equal to 80 Å.

3. A thin film magnetic head according to claim 1, wherein the average roughness (Ra) of the centerline of the film surface of the soft magnetic film is less than or equal to 140 Å.

4. A thin film magnetic head according to claim 1, wherein the saturation magnetic flux density (Ms) of the soft magnetic film is greater than or equal to 1.0.

5. A thin film magnetic head according to claim 1, wherein the soft magnetic film is formed in a plating bath containing Fe ions and Ni ions to which at least one amino organic material is added and contains at least Fe, Ni, O, C, and S.

6. A thin film magnetic head according to claim 5, wherein saccharin is added to the plating bath.

7. A thin film magnetic head according to claim 5, wherein the at least one amino organic material is selected from the group of ethylenediamine (EDA), diethylenetriamine (DETA), triethylenetetramine (TETA), alanine (Ala), and glutamic acid (Glu).

* * * * *

UNITED STATES PATENT AND TRADEMARK OFFICE
CERTIFICATE OF CORRECTION

PATENT NO.    : 6,638,596 B1
DATED         : October 28, 2003
INVENTOR(S)   : Mitsuhiro Gotoh et al.

It is certified that error appears in the above-identified patent and that said Letters Patent is hereby corrected as shown below:

<u>Title page,</u>
Item [57], ABSTRACT,
Lines 1-8, delete "A soft magnetic film of the invention is to improve a resistivity $\rho$ while maintaining a coercive force Hc and a saturation magnetic flux density Ms in good states by adding an element X (X is one or more kinds of elements selected from O, C, N, and S). Further, a thin film magnetic head capable of coping with an increase in a recording density and an increase in a recording frequency can be provided by using the soft magnetic film in core layers." and substitute -- The soft magnetic film of the present invention improves resistivity $\rho$ while maintaining the coercive force Hc and the saturation magnetic flux density Ms in suitable states by adding an element X (X is at least one element selected from the group of O, C, N, and S). Further, a thin film magnetic head capable of coping with an increase in a recording density and an increase in a recording frequency can be provided by using the soft magnetic film in core layers. -- in its place.

<u>Column 22,</u>
Line 11, delete "mass, the amount of S is and at" and substitute -- mass, and the amount of S is at -- in its place.
Line 24, delete "to 1.0." and substitute -- to 1.0T. -- in its place.

Signed and Sealed this

Thirtieth Day of March, 2004

JON W. DUDAS
*Acting Director of the United States Patent and Trademark Office*